Jan. 5, 1960    A. V. RICE ET AL    2,920,156
VEHICLE BACK-UP WARNING DEVICE
Filed April 17, 1959
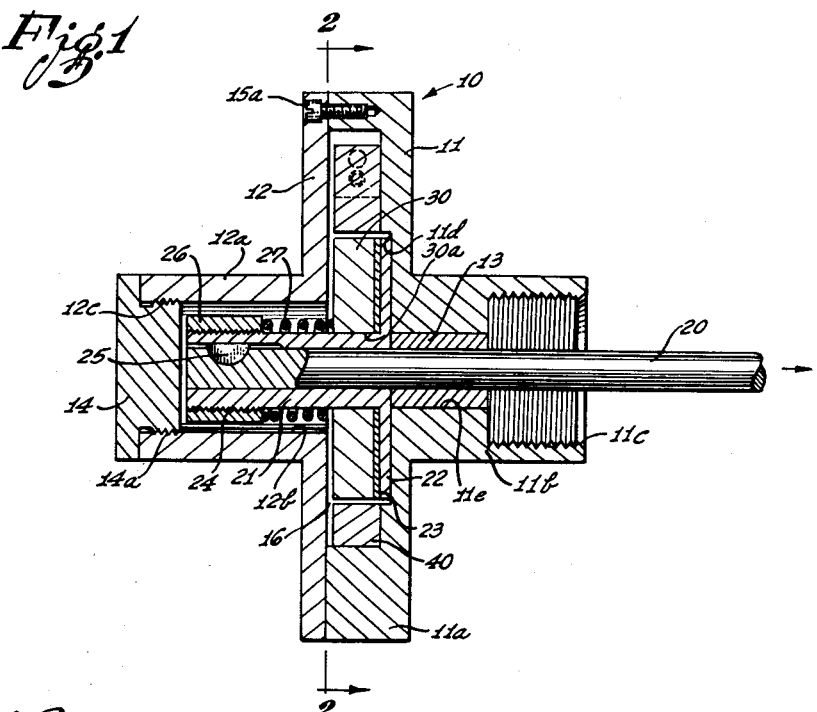
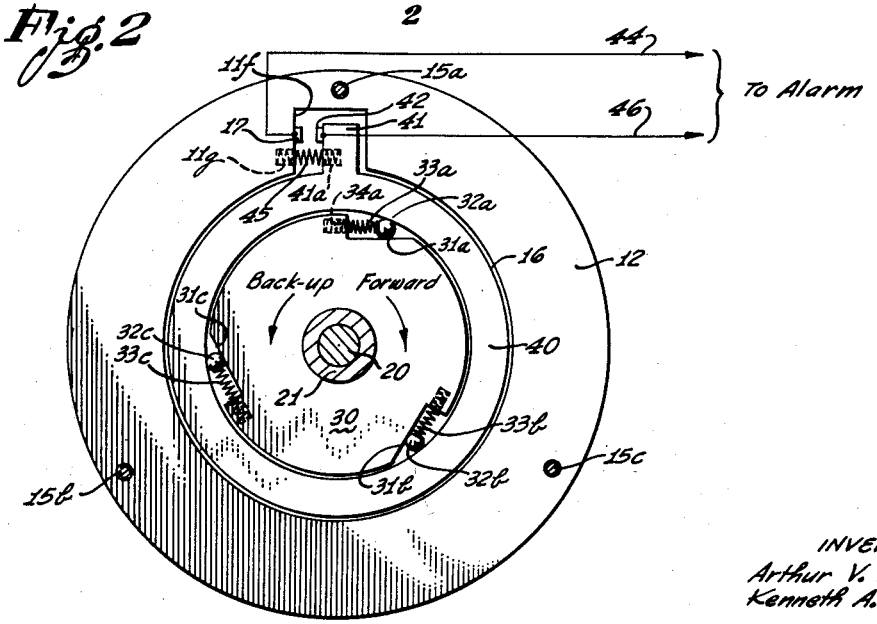
INVENTORS:
Arthur V. Rice
Kenneth A. King
By Gene W. Arant
Attorney

United States Patent Office 2,920,156
Patented Jan. 5, 1960

2,920,156

VEHICLE BACK-UP WARNING DEVICE

Arthur V. Rice, Yorba Linda, and Kenneth A. King, Orange, Calif., assignors to Raymond E. Cote, Huntington Beach, Calif.

Application April 17, 1959, Serial No. 807,144

5 Claims. (Cl. 200—61.39)

The present invention relates to a vehicle back-up warning device for energizing an electrical warning circuit whenever the vehicle drive shaft rotates in the reverse direction.

Back-up warning devices are particularly necessary for automotive vehicles, because of the great likelihood that the space into which a particular vehicle is backing is already occupied by one or more pedestrians. Warning devices previously devised for this purpose have either been actuated by the wheels of the vehicle, in response to reverse rotation thereof, or from the vehicle transmission, whenever the transmission is placed in reverse gear. Devices actuated from the wheel rotation have proved to be hazardous in and of themselves. Devices actuated from the transmission are not altogether satisfactory for the reason that they give a false indication when the vehicle is in reverse gear, both prior to the actual commencement of reverse movement, and after the reverse movement has ceased.

The present invention provides a warning device for energizing an electrical circuit when, and only when, the vehicle drive shaft rotates in the reverse direction. The invention is adapted to be coupled by conventional means to the speedometer cable of the vehicle, the speedometer cable in turn being conventionally driven from the vehicle drive shaft.

An object of the invention, therefore, is to provide a back-up warning device adapted to be conveniently coupled to the speedometer cable of a vehicle, and to energize an electrical warning circuit only so long as the vehicle drive shaft is rotating in the reverse direction.

Another object of the invention is to provide a warning device of the above type which is small, compact, reliable in operation and inexpensive to manufacture.

The above and other objects of the invention will be more readily understood from the following description, in conjunction with the accompanying drawing, in which:

Figure 1 is a longitudinal cross-sectional view of a preferred form of our invention; and Figure 2 is a transverse cross-sectional view of the device taken on the line 2—2 of Figure 1.

The general concept of our invention may be briefly outlined as follows:

A fixed housing is provided, containing a shaft which is adapted to be rotatably driven via the speedometer cable from the vehicle drive shaft. A cylindrical member, or first rotor, is supported upon the shaft in rotatable relationship with both the shaft and the housing. Frictional drive means are provided for normally imparting the rotation of the shaft to the cylindrical member, or first rotor. Surrounding the cylindrical member there is provided an annular ring, or a second rotor, which is adapted to rotate both with respect to the first rotor and to the fixed housing. Expansible drive means are provided between the first and second rotors, and adapted to drive the second rotor in response to rotation of the first rotor in one predetermined direction only. Finally, electrical contact means are provided on the housing and the second rotor, which close whenever the second rotor rotates from its normal or quiescent position by a predetermined amount with respect to the housing, the frictional drive means being adapted to slip during the continued reverse rotation of the shaft for maintaining the contacts closed, and spring means being provided in association with the contacts for overcoming the force of the frictional drive means to open the contacts when the reverse rotation of the shaft has ceased.

Referring now to the drawing, a fixed housing 10 includes a right hand cup-shaped member 11 and a left hand cup-shaped member 12, together with various associated component parts, all of which will be described in greater detail subsequently. A shaft 20 adapted to be rotatably driven from the speedometer cable of the vehicle projects into the fixed housing in rotatable relationship therewith. A cylindrical member, or first rotor, 30 is carried on shaft 20 and is normally rotatably driven thereby through the medium of frictional drive means which includes various parts identified as 21–27, inclusive, and which will be subsequently described in greater detail.

An annular ring, or second rotor 40, completely encircles cylindrical member 30 in concentric relationship with both cylindrical member 30 and the shaft 20. An expansible drive means is provided, the various parts whereof are identified by the numeral 31, 32 and 33 together with letters a, b and c, which imparts rotation of cylindrical member 30 to annular ring 40 during only one predetermined direction of such rotation. Annular ring or second rotor 40 has a projecting portion 41 on which is provided an electrical contact element 42, adapted to mate with a corresponding electrical contact element 17 which is fixedly mounted upon the housing 10. In the normal or quiescent position of annular ring 40 the contacts are open, but when ring 40 rotates a slight amount in the above mentioned predetermined direction relative to the housing, the two electrical contacts come into engagement.

A spring 45 is provided which aids in controlling the opening or closing of the electrical contacts. Spring 45 is a helical spring whose axis is aligned approximately tangential to annular ring 40, and which has one end engaging the projection 41 while its other end engages that portion of fixed housing 10 immediately adjacent the electrical contact 17. In the absence of any rotation of shaft 20 in the predetermined or reverse rotation direction, spring 45 maintains the contacts in a separated position. When shaft 20 rotates in the reverse direction this rotation is initially imparted to cylindrical member 30 and hence via the frictional drive means to annular ring 40. Ring 40 rotates against the force of spring 45 a sufficient distance to cause the two electrical contacts to engage, whereupon the frictional drive means commences to slip and permit the continued rotation of shaft 20. When the reverse rotation of shaft 20 ceases, the force of spring 45 is sufficient to open the contacts by rotating ring 40, despite the resisting tendency of the frictional drive means.

Having thus generally described the concept of the invention it is now convenient to describe the details of the various parts.

In the housing 10 the right hand cup-shaped member 11 includes a flat circular base portion as well as a relatively thick circumferentially extending flange or wall 11a projecting from the left hand side of the base portion, as seen in Figure 1. A much smaller tubular portion 11b projects from the right hand side of the base plate. The outer end of member 11b is internally threaded at 11e to provide a means for rigidly supporting the housing with respect to the vehicle. On its left hand side the base plate 11 has a flat circular recess 11d formed therein, which is of somewhat greater diameter than tubular extension 11b but substantially less than the flange 11a. A concentric bore 11e extends from recess 11d to threaded portion 11c, and carries a cylindrical bearing sleeve 13 within which the shaft 20 is rotatably supported.

Member 12 consists of a flat circular plate having a tubular portion 12a extending to the left thereof, as seen in Figure 1. Flat plate 12 near its circumferential edge is fastened to flange portion 11d by means of bolts 15a, 15b, 15c, thus providing an enclosed cylindrical space 16 within the housing 10. Tubular member 12a has an outer diameter substantially equal to that of tubular member 11b, and has a large concentric bore 12b extending therethrough. Near its outer or left hand end as shown in Figure 1 the member 12a is internally threaded at 12c. The end of shaft 20 projects through most of the length of circular bore 12b, and carries an elongated sleeve 21 thereon which is rigidly fastened thereto by a keyway or by welding, as indicated at 25. At its right hand end the sleeve 21 has a transverse circular flange portion 22 which occupies recess 11d of member 11 in rotatable engagement therewith. The flange portion 22 is provided on its left hand surface with a coating of friction material 23. On its left hand end, the sleeve 21 is provided with exterior threads 24.

Cylindrical member or first rotor 30, has a concentric bore 30a formed therein which fits over sleeve 21 in rotatable relationship therewith, with the right hand end surface of rotor 30 being immediately adjacent the friction surface 23. A helical spring 27 encircles sleeve 21 immediately to the left of rotor 30, and at the extreme left end of sleeve 21, a nut 26 engages the threads 24. Thus spring 27 exerts pressure on rotor 30 to force the rotor into contact with friction surface 23, the amount of the pressure being controllable by the setting of nut 26.

A plug 14 has an exteriorly threaded body portion 14a. Plug 14 closes the left end of tubular member 12a, with the threads 14a being in engagement with threads 12c.

Flange portion 11a of housing member 11 has a cubical recess 11f formed in the upper portion thereof in communication with cylindrical space 16 as may best be seen in Figure 2. On the left hand wall of recess 11f, a fixed electrical contact element 17 is provided, to which is connected a first electrical conductor 44. Annular ring or second rotor 40 encircles first rotor 30 and substantially fills the cylindrical space 16. In addition, second rotor 40 has a rectangular portion 41 thereon which extends into recess 11f. Extension 41 is provided on its left hand side with a second electrical contact 42, to which a second electrical conductor 46 is connected. Contacts 17 and 42 are adapted to engage whenever the second rotor 40 rotates in the counter-clockwise direction, as seen in Figure 2, which direction corresponds to reverse rotation of the vehicle drive shaft. When second rotor 40 rotates in the other or forward direction of the vehicle drive shaft, the contacts open but only to a limited extent since extension 41 is confined within the relatively small recess 11f.

A horizontal recess 11g is formed in flange member 11a adjacent electrical contact element 17, while oppositely facing recess 41a is formed in the extension member 41. Spring 45 is horizontally disposed with its two ends occupying the above mentioned recesses, the spring 45 therefore tending at all times to urge the contacts to their open position.

The expansible drive means by which first rotor 30 selectively drives the second rotor 40 is provided as follows:

As seen in Figure 2 the first rotor 30 carries on its peripheral surface a plurality of inclined recesses 31a, 31b and 31c. Each recess is cut in an L shape, the short leg of the L being approximately radially disposed while the long leg of the L is parallel to that surface portion of the cylinder which is adjacent the tip of the short leg of the L, but is inclined at an angle of approximately 10 degrees with respect to the surface point on the cylindrical member at which the end of the long leg of the L terminates. With specific reference to recess 31a, a shallow cylindrical bore 34a is formed in the rotor 30 which passes through the short leg of the L of recess 31a in parallel alignment with the long leg of the L. A helical spring 33a has one end disposed within the recess 34a, while its other end engages a metal ball 32a. Spring 33a at all times tends to urge ball 32a up the long leg of the L toward the surface of rotor 30. Each of the other slots 31b and 31c has a corresponding ball and spring arrangement.

When rotor 30 rotates clockwise as seen in Figure 2, corresponding to the forward rotation of the vehicle drive shaft, the balls 32a, 32b, 32c tend to be forced by the inner surface of second rotor 40 to rotate in the counter-clockwise direction, and to roll along the long leg of the L shaped recess so as to press against their corresponding springs. On the other hand, when rotor 30 rotates in a counter-clockwise or reverse direction, each of the balls is driven to rotate in the clockwise direction, thus rolling "up hill" on the long leg of the L shaped recess and effectively increasing the outer diameter of the first rotor 30. The balls rapidly come into locking engagement with second rotor 40 with the result that rotor 40 rotates counter-clockwise sufficiently to cause the contacts to close.

When the contacts close, further rotation of both the first and second rotors in inhibited, with the result that friction surface 23 slips on the end surface of rotor 30. Thereafter, when the reverse shaft rotation ceases, spring 45 overcomes the frictional force of friction surface 23 upon rotor 30 and opens the contacts.

Although in the form of the invention illustrated herein the second rotor lies in the same transverse plan as the first rotor, it will be readily appreciated that another form of the invention can be constructed in which the two rotors are longitudinally spaced from each other along the shaft. The frictional drive means for normally driving the first rotor in synchronism with the shaft would then occupy a somewhat different configuration. Also, the expansible, unidirectional drive means for selectively driving the second rotor from the first rotor would then be disposed upon the end of the first rotor rather than about its outer circumference.

While the drawing indicates the use of metal parts throughout, it will be readily understood that the invention does not carry large mechanical loads, and that it is therefore feasible to fabricate some of the component parts from plastic or other light weight material.

It will be understood that our invention is not limited to the various details shown and described herein except to the extent defined in the following claims.

We claim:

1. A back-up warning device for an automotive vehicle, comprising a fixed housing on which a first electrical contact is provided, an annular ring carrying a second electrical contact and rotatably supported within said housing for selectively bringing said contacts into engagement, spring means normally urging said contacts apart, an electrical warning circuit connected to said contacts, a cylindrical member within said annular ring adapted to be rotatably driven from the vehicle drive shaft, and means for frictionally driving said annular ring to bring said contacts into engagement only when said cylindrical member is rotating in one predetermined direction, said last-named means including a plurality of circumferentially extending inclined recesses provided in the peripheral surface of said cylindrical member, and a corresponding plurality of balls each adapted to roll up the inclined surface of the associated recess in response to frictional engagement by the inner surface of said annular ring during rotation of said cylindrical member in said predetermined direction relative thereto.

2. A back-up warning device for an automotive vehicle comprising a fixed housing, a shaft rotatable within said housing, a cylindrical member carried by said shaft and having on its periphery a plurality of circumferentially extending inclined recesses, a plurality of balls riding in corresponding ones of said recesses, a plurality of springs each urging one of said balls up the corresponding inclined surface outwardly from said shaft, an annular ring enclosing said cylindrical member and having a first electrical contact thereon, a second electrical contact provided on said housing, an electrical warning circuit connected to said contacts, spring means normally urging said contacts apart, the action of the device being such that for one direction of rotation of said cylindrical member said balls are compressed against their corresponding spring means and said annular ring tends to rotate for keeping said contacts apart, while for the other direction of rotation of said cylindrical member said balls move up the associated inclined surfaces to increase the effective outer diameter of said cylindrical member and thus frictionally engage the inner surface of said annular ring to force said contacts together.

3. A vehicle back-up warning device for energizing an electrical warning circuit whenever the vehcile drive shaft rotates in a reverse direction, said device comprising: a cylindrical member adapted to rotate with the drive shaft and having a plurality of circumferentially extending inclined recesses provided in the peripheral surface thereof; a plurality of balls, one disposed in each of said recesses; separate spring means associated with each recess urging the corresponding ball up the inclined surface thereof so as to increase the effective outer diameter of said cylindrical member; an annular ring enclosing said cylindrical member and having an inner surface adapted to be frictionally engaged by said balls; a fixed housing surrounding said cylindrical member and said annular ring; and a pair of electrical contacts associated with said annular ring and said housing, respectively, and adapted to close the electrical warning circuit whenever said cylindrical member rotates relative to said housing in the direction of increasing depth of said recesses.

4. A vehicle back-up warning device for energizing an electrical warning circuit whenever the vehicle drive shaft rotates in a reverse direction, said device comprising: a housing; a shaft rotatably supported within said housing, and adapted to be driven from the vehicle drive shaft; a cylindrical member rotatably supported upon said shaft; friction drive means for imparting rotation of said shaft to said cylindrical member; an annular ring encircling said cylindrical member in rotatable relationship therewith; expansible means associated with the periphery of said cylindrical member and responsive to relative rotation between said cylindrical member and said annular ring in one predetermined direction only for drivingly coupling said member to said ring; a pair of normally separated electrical contacts provided on said housing and said ring, respectively, and adapted to close when said ring rotates in said predetermined direction relative to said housing; and a spring coupling said housing and ring together for normally maintaining the separation of said contacts; the operation of the device being such that rotation of said shaft in said predetermined direction relative to said housing initially drives said cylindrical member causing said expansible means to expand and thereby rotate said annular ring for closing said contacts, said friction drive means being adapted to permit rotation of said shaft relative to said cylindrical member after said contacts close, said spring being operable after the shaft rotation ceases for overcoming the static friction of said friction drive means sufficiently to return said contacts to their normally open position.

5. A vehicle back-up warning device for energizing an electrical warning circuit only so long as the vehicle drive shaft rotates in the reverse direction, said device comprising: a housing; a shaft adapted to be driven from the vehicle drive shaft and rotatably supported within said housing; a first rotor rotatably supported upon said shaft; friction drive means for normally imparting rotation of said shaft to said first rotor; a second rotor rotatably supported upon said shaft and normally freely rotatable with respect thereto; expansible drive means associated with said first rotor and responsive to rotation of said first rotor in the reverse direction for drivingly coupling said first rotor to said second rotor; a pair of normally separated electrical contacts provided on said housing and said second rotor, respectively, and adapted to close when said second rotor rotates in the reverse direction relative to said housing; and a spring coupling said housing and said second rotor together and normally maintaining the separation of said contacts, said spring being operable after the shaft rotation ceases for overcoming the static friction of said friction drive means sufficiently to slightly rotate said second rotor in the forward direction and thus to return said contacts to their normally open position.

References Cited in the file of this patent

UNITED STATES PATENTS

| | | |
|---|---|---|
| 2,427,453 | Hadley | Sept. 16, 1947 |
| 2,580,677 | Hadley | Jan. 1, 1952 |
| 2,796,481 | Vining | June 18, 1957 |